(12) United States Patent
Dinkelmann et al.

(10) Patent No.: US 12,058,267 B2
(45) Date of Patent: Aug. 6, 2024

(54) DEVICE WITH BIOMETRIC SYSTEM

(71) Applicant: ICM AIRPORT TECHNICS AUSTRALIA PTY LTD, Botany (AU)

(72) Inventors: Rainer Rudolf Dinkelmann, Sydney (AU); Thomas Christopher Wolfgang Landgrebe, Sydney (AU); Joshua James Maxwell Merritt, Sydney (AU)

(73) Assignee: ICM AIRPORT TECHNICS AUSTRALIA PTY LTD, Botany (AU)

( * ) Notice: Subject to any disclaimer, the term of this patent is extended or adjusted under 35 U.S.C. 154(b) by 785 days.

(21) Appl. No.: 16/699,367

(22) Filed: Nov. 29, 2019

(65) Prior Publication Data

US 2021/0144009 A1    May 13, 2021

(30) Foreign Application Priority Data

Nov. 11, 2019  (AU) ................. 2019904246

(51) Int. Cl.
  *H04L 9/32* (2006.01)
  *G06V 10/25* (2022.01)
  *G06V 40/16* (2022.01)
  *G06V 10/75* (2022.01)

(52) U.S. Cl.
  CPC ............ *H04L 9/3231* (2013.01); *G06V 10/25* (2022.01); *G06V 40/172* (2022.01); *G06V 10/759* (2022.01)

(58) Field of Classification Search
  CPC .... H04L 9/3231; G06V 10/25; G06V 40/172; G06V 10/759; G06V 10/75; G06V 10/993; G06F 2221/2111; G06F 21/32; G06Q 20/3278; G06Q 20/352; G06Q 20/385; G06Q 20/40145; G06Q 50/265; G06T 7/11; G06T 2207/30168
  See application file for complete search history.

(56) References Cited

U.S. PATENT DOCUMENTS

| | | |
|---|---|---|
| 4,792,018 A | 12/1988 | Humble et al. |
| 4,832,203 A | 5/1989 | Nozawa |
| 5,245,178 A | 9/1993 | Elias |
| 5,271,641 A | 12/1993 | Whited |
| 5,576,692 A | 11/1996 | Tompkins et al. |
| 5,793,639 A | 8/1998 | Yamazaki |
| 5,866,888 A | 2/1999 | Bravman et al. |
| 5,920,053 A | 7/1999 | DeBrouse |
| 6,304,183 B1 | 10/2001 | Causey |

(Continued)

FOREIGN PATENT DOCUMENTS

| | | |
|---|---|---|
| AU | 2003302490 B1 | 9/2004 |
| CA | 2337584 A1 | 8/2002 |

(Continued)

*Primary Examiner* — Shewaye Gelagay
*Assistant Examiner* — Carlton Johnson
(74) *Attorney, Agent, or Firm* — Perry + Currier

(57) ABSTRACT

A device for verifying a subject includes: a device body comprising a processor and a biometric system; wherein the biometric system comprises a first image capture device and a second image capture device, in which the first image capture device is configured to define a spatial region and the second image capture device is configured to capture an image of a subject within said spatial region, and the processor is configured to conduct an identification process on the captured image of the subject within the spatial region.

16 Claims, 5 Drawing Sheets

(56) References Cited

U.S. PATENT DOCUMENTS

| | | |
|---|---|---|
| 6,476,812 B1 | 11/2002 | Yoshigahara et al. |
| 6,507,278 B1 | 1/2003 | Brunetti et al. |
| 6,696,947 B1 | 2/2004 | Bybee |
| 6,698,653 B1 | 3/2004 | Diamond et al. |
| 6,750,757 B1 | 6/2004 | Gabig, Jr. et al. |
| 6,807,458 B2 | 10/2004 | Quackenbush et al. |
| 6,967,579 B1 | 11/2005 | Elizondo |
| 6,975,221 B2 | 12/2005 | Monck |
| 7,062,011 B1 | 6/2006 | Tybinkowski et al. |
| 7,086,591 B2 | 8/2006 | Anderson |
| 7,389,867 B2 | 6/2008 | Hillmantel et al. |
| 7,415,094 B2 | 8/2008 | Johnson et al. |
| 7,418,077 B2 | 8/2008 | Gray |
| 7,483,510 B2 | 1/2009 | Carver et al. |
| 7,613,622 B2 | 11/2009 | Jindel |
| 7,663,109 B2 | 2/2010 | Kang et al. |
| 7,702,069 B2 | 4/2010 | Panesar et al. |
| 7,720,194 B2 | 5/2010 | Connelly et al. |
| 7,742,568 B2 | 6/2010 | Smith |
| 7,802,724 B1 | 9/2010 | Nohr |
| 7,810,697 B2 | 10/2010 | Charbel et al. |
| 7,819,580 B2 | 10/2010 | Song et al. |
| 7,991,242 B2 | 8/2011 | Perron et al. |
| 8,068,600 B2 | 11/2011 | Collins, Jr. |
| D658,294 S | 4/2012 | Awad |
| 8,213,570 B2 | 7/2012 | Panesar et al. |
| 8,432,448 B2 | 4/2013 | Hassapis et al. |
| 8,502,643 B2 | 8/2013 | Oberman et al. |
| D705,931 S | 5/2014 | Wilden |
| D705,932 S | 5/2014 | Matuschek et al. |
| D705,933 S | 5/2014 | Matuschek et al. |
| D705,934 S | 5/2014 | Matuschek et al. |
| D705,935 S | 5/2014 | Matuschek et al. |
| D718,156 S | 11/2014 | Demetrescu et al. |
| 8,879,791 B2 | 11/2014 | Drouin et al. |
| D777,346 S | 1/2017 | Journet |
| 9,714,099 B2 | 7/2017 | Dinkelmann et al. |
| D804,670 S | 12/2017 | Zhao et al. |
| 9,940,588 B2 | 4/2018 | Sanderson et al. |
| D817,494 S | 5/2018 | Apetauer et al. |
| 10,096,122 B1* | 10/2018 | Agrawal ............... G06T 7/90 |
| 10,228,487 B2 | 3/2019 | Mastronardi |
| 10,473,811 B1 | 11/2019 | Bairashewski et al. |
| 10,873,697 B1* | 12/2020 | Jain ............... H04N 21/234318 |
| D966,124 S | 10/2022 | Takami |
| D966,125 S | 10/2022 | Takami |
| D966,126 S | 10/2022 | Takami |
| D972,734 S | 12/2022 | Farnsworth et al. |
| 2002/0113715 A1 | 8/2002 | Wilson |
| 2003/0061085 A1 | 3/2003 | Lanigan, Sr. |
| 2003/0120510 A1 | 6/2003 | Panek |
| 2004/0120454 A1 | 6/2004 | Ellenbogen et al. |
| 2005/0065643 A1 | 3/2005 | Elefante |
| 2007/0116178 A1 | 5/2007 | Hernandez Moysi |
| 2011/0266092 A1 | 11/2011 | Marquis et al. |
| 2015/0187068 A1* | 7/2015 | Krishna ............... G06T 7/0016 382/128 |
| 2016/0051211 A1 | 2/2016 | Linev |
| 2017/0336203 A1* | 11/2017 | Barnes ............... G01S 17/88 |
| 2018/0013958 A1* | 1/2018 | Nakata ............... H04N 5/2628 |
| 2018/0029724 A1 | 2/2018 | Dinkelmann et al. |
| 2018/0032923 A1 | 2/2018 | Sanderson et al. |
| 2019/0278974 A1* | 9/2019 | Lubin ............... G06V 20/64 |
| 2019/0279371 A1* | 9/2019 | Usikov ............... G06T 7/12 |
| 2021/0108459 A1 | 4/2021 | O'Brien et al. |
| 2021/0144009 A1 | 5/2021 | Dinkelmann et al. |
| 2021/0181369 A1 | 6/2021 | Prabhu et al. |

FOREIGN PATENT DOCUMENTS

| | | |
|---|---|---|
| CA | 3008725 A1 | 9/2015 |
| CN | 1708686 A | 12/2005 |
| CN | 101101627 A | 1/2008 |
| CN | 101110145 A | 1/2008 |
| CN | 201337989 Y | 11/2009 |
| CN | 102063751 B | 8/2012 |
| DE | 2450567 B1 | 1/1976 |
| DE | 3007130 A1 | 9/1981 |
| DE | 19931756 A1 | 1/2001 |
| DE | 10131407 A1 | 1/2003 |
| DE | 102006057605 A1 | 6/2008 |
| DE | 102007035272 A1 | 1/2009 |
| DE | 102008025248 A1 | 12/2009 |
| DE | 102012013247 B4 | 1/2019 |
| DK | 167274 B1 | 10/1993 |
| EP | 2364912 B1 | 4/2013 |
| EP | 2939201 A4 | 8/2016 |
| FR | 2929605 B1 | 8/2010 |
| GB | 2264094 B | 2/1995 |
| GB | 2457243 A | 8/2009 |
| GB | 2423687 B | 4/2010 |
| JP | S63143665 A | 6/1988 |
| JP | H0761512 A | 3/1995 |
| JP | H07128019 A | 5/1995 |
| JP | 2562462 Y2 | 2/1998 |
| JP | 3317111 B2 | 8/2002 |
| JP | 3371897 B2 | 1/2003 |
| JP | 2003063609 A | 3/2003 |
| JP | 2003074790 A | 3/2003 |
| JP | 2004163342 A | 6/2004 |
| JP | 3817445 B2 | 9/2006 |
| JP | 4014883 B2 | 11/2007 |
| JP | 2008233961 A | 10/2008 |
| JP | 2009245050 A | 10/2009 |
| JP | 5289226 B2 | 9/2013 |
| JP | 2013542403 A | 11/2013 |
| KR | 100687744 B1 | 2/2007 |
| KR | 20090022681 A | 3/2009 |
| KR | 100672044 B1 | 1/2017 |
| NL | 1022027 C2 | 6/2004 |
| NL | 1025759 C2 | 9/2005 |
| NL | 1033178 C2 | 7/2008 |
| NL | 1034048 C2 | 12/2008 |
| NL | 2007140 C2 | 1/2013 |
| NL | 2008607 C2 | 10/2013 |
| SE | 464734 B | 6/1991 |
| WO | WO-2007098366 A2 | 8/2007 |
| WO | WO-2012012841 A1 | 2/2012 |

\* cited by examiner

DEVICE WITH BIOMETRIC SYSTEM

CROSS-REFERENCE TO RELATED APPLICATION

This application claims priority from Australian Patent Application No. 2019904246, filed Nov. 11, 2019, the contents of which is incorporated herein by reference.

TECHNICAL FIELD

The present disclosure relates to terminals and biometric systems. More particularly, the present disclosure relates to kiosks and terminals which can be used to verify and register or check-in a user at a transit location with biometric systems.

BACKGROUND

Passengers at transit terminals may be required to check-in and/or obtain boarding passes for an upcoming trip or journey. The passengers may use a customer service desk with an attendant to check-in and to receive their boarding pass, however these methods are generally time consuming and labour intensive for persons working at the desk. Check-in handled manually is also expensive due to the need to arrange for full-time staff, and for smaller terminals a lack of staff can result in large queue times for passengers. As such, self-service terminals or kiosks may alternatively be used which can be faster to check-in than attendant-at-desk check-in methods.

One main problem with these self-service terminal and kiosk check-in methods is that a verification of the passenger details is conducted by a computer rather than a person. As such, there are issues in relation to security and in relation to accurate and fast identification of the passenger. Typically, a camera will be used to capture images of a passenger in front of a kiosk or terminal, and subsequently a matching process can begin. The difficulties with image recognition are generally related to poor image quality, potentially resulting in inaccurate identification of a passenger in a captured image and also long processing times of the image.

Generally, these systems will capture a high-resolution image and attempt to identify persons within this image. However, there is no assurance that these persons can be identified, let alone identified correctly or with any accuracy. Terminals and kiosks are therefore still lacking in basic design functionality with regards to biometric systems.

Further, known terminals and kiosks will generally require a significant amount of processing power to assess and analyse images captured of subjects. This is primarily due to the high image resolution that is ideally captured and the likelihood of lack of quality of the image which can occur due to low frame rate capture and processing of images. This is also a concern for eGates or border security gates which require fast and accurate verification of a passenger's identity. As such, a solution to poor biometric systems for terminals, kiosks and other biometric gates may be desirable.

Any discussion of the prior art throughout the specification should in no way be considered as an admission that such prior art is widely known or forms part of common general knowledge in the field.

SUMMARY

It may be advantageous to provide a system which can determine a subject.

It may be advantageous to provide a biometric system which can identify a target subject with more than one subject in view.

It may be advantageous to provide a system which can more quickly identify subjects within a virtual region when compared to previous prior art systems.

It may be advantageous to provide a biometric system which can capture high-resolution images of a subject.

It may be advantageous to provide a terminal which can allow for faster use by a passenger than state-of-the-art terminals or kiosks.

It may be advantageous to provide a system which can determine an optimal image for facial recognition from a series of captured images.

It may be advantageous to provide a system which can match a subject image with an image of a user within a database more efficiently than state-of-the-art matching systems.

It may be advantageous to provide a biometric device which can be used to monitor a region and identify subjects both within the region and entering into the region.

It may be advantageous to provide an improved biometric system which can identify subjects more efficiently than state-of-the-art systems.

It may be advantageous to provide a method to detect subjects with at least one biometric camera.

It is an object of the present invention to overcome or ameliorate at least one of the disadvantages of the prior art, or to provide a useful alternative.

Although the invention has been described with reference to specific examples, it will be appreciated by those skilled in the art that the invention may be embodied in many other forms, in keeping with the broad principles and the spirit of the invention described herein.

In a first aspect, there may be provided a device or terminal device for verifying a subject. The device comprising a device body comprising a processor and a biometric system. The processor in communication with the biometric system; and wherein the biometric system comprises a first image capture device and a second image capture device, in which the first image capture device may define a spatial region and the second image capture device may be configured to capture an image of a subject within said spatial region, and an identification process may be conducted on the captured image of the subject within the region. Preferably, the spatial region may be a virtual region.

Preferably, the first capture means and the second capture means are capture means selected from the following group; a stereoscopic camera, a 3-dimensional camera, a 2-dimensional camera, a fish eye camera, RGB camera, an RF camera, a spectral camera, a digital camera, a motion sensor and a combination of thereof. Preferably, the spatial region may be segmented with a 3D segmentation process. Preferably, the image of a subject may be a high-resolution image, in which the high-resolution image may be associated with a score based on at least one parameter selected from the following group; target anatomy detected, image quality, focus, target anatomy pose, alignment, image resolution, and pixel count. Preferably, the score associated with the high-resolution image must be above a predetermined threshold before the identification process may be conducted. Preferably, the first image capture device may be configured to generate a target region. Preferably, the second image capture device may be activated after a target region has been generated by the first image capture means. Preferably, more than one image of the subject may be captured per time period and the highest scoring images of the subject are recorded and stored. Preferably, the device may be configured to allow access to a subject if the subject passes the identification process and has a predetermined authentication or permission associated with their identification. Preferably, a plurality of images are captured of the subject and stored with an associated subject profile.

In another aspect, there may be provided a device for detecting a subject within a region. The device may run the following process: generating a virtual region with a first image capture device; isolating a subject within the virtual region; processing the isolated subject with 3D segmentation processes to identify a target region; and capturing a high-resolution image of the target region with a second image capture device and storing the captured high-resolution image in a database. Preferably, the virtual region may be a spatial region.

Preferably, the device may be further configured to assess the high-resolution image for at least one of; pixel count, focus, blur, resolution, alignment and determined stance of the subject. Preferably, the high-resolution image may be rated and stored by the system. Preferably, the second image capture device may be activated after identification of the target region. Preferably, a subject recognition process may be conducted to identify the subject within the captured high-resolution image.

In yet another aspect, there may be provided an image recognition device for identifying an object of interest comprising: a spatial sensor adapted to generate a spatial region containing the object of interest based on a distance of the object of interest relative to the spatial sensor; a RGB sensor adapted to capture a two-dimensional image containing the object of interest, a processor in communication with the spatial sensor and RGB sensor; and wherein a transformation process may be executed to project the spatial region to a two-dimensional region on the two-dimensional image and identifying the object of interest within the two-dimensional region.

In yet another aspect, there may be provided a terminal device for verifying a subject, the device comprising: a device body comprising a processor and a biometric system; and wherein the biometric system comprises a first image capture device and a second image capture device, in which the first image capture device is configured to define a spatial region and the second image capture device is configured to capture an image of a subject within said spatial region, and the processor is configured to conduct an identification process on the captured image of the subject within the spatial region.

Preferably, the first capture means and the second capture means are capture means selected from the following group; a stereoscopic camera, a 3-dimensional camera, a 2-dimensional camera, a fish eye camera, RGB camera, an RF camera, a spectral camera, a digital camera, a motion sensor and a combination of thereof.

Preferably, the biometric system is configured to segment the spatial region with a 3D segmentation process.

Preferably, the first and/or second image capture devices are configured to capture a high-resolution image of the subject, and the biometric system is configured to associate the high-resolution image with a score based on at least one parameter selected from the following group; target anatomy detected, image quality, focus, target anatomy pose, alignment, image resolution, and pixel count.

Preferably, the first image capture device is configured to generate a target region.

Preferably, the second image capture device is configured to activate after a target region has been generated by the first image capture means.

Preferably, the second image capture device is configured to capture more than one image of the subject per time period and the highest scoring images of the subject are recorded and stored.

Preferably, the device is configured to allow access to a subject if the subject passes the identification process and has a predetermined authentication or permission associated with their identification.

Preferably, the first and/or second image capture device is configured to capture a plurality of images of the subject and store the captured images with an associated subject profile.

In yet another aspect, there may be provided a device for detecting a subject within a region, the device running the following process or method: generating a virtual region with a first image capture device; isolating a subject within the virtual region; processing the isolated subject with 3D segmentation processes to identify a target region; and capturing a high-resolution image of the target region with a second image capture device and storing the captured high-resolution image in a database. a processor in communication with the spatial sensor and RGB sensor;

Preferably, further configured to assess the high-resolution image for at least one of; pixel count, focus, blur, resolution, alignment and stance of the subject.

Preferably, the device is configured to assign a rating to the high-resolution image and the device is configured to store the high resolution image.

Preferably, the second image capture device is configured to activate after the identification of the target region.

Preferably, a subject recognition process is adapted to identify the subject within the captured high-resolution image.

In yet another aspect, there may be provided an image recognition device for identifying an object of interest comprising; a spatial sensor adapted to generate a spatial region containing the object of interest based on a distance of the object of interest relative to the spatial sensor; a RGB sensor adapted to capture a two dimension image containing the object of interest, a processor in communication with the spatial sensor and RGB sensor; and wherein the image recognition device being configured to execute a transformation process to project the spatial region to a two-dimensional region on the two-dimensional image and to identify the object of interest within the two-dimensional region.

In yet another aspect, there may be provided a computer-readable medium containing computer-readable code which, when run on a processor, causes the processor to perform the following steps: cause a first image-capture device to capture a two-dimensional image containing an object of interest; identify the object of interest within the two-dimensional image using three-dimensional segmentation; cause a second image-capture device to capture a high-definition image of the object of interest; and store the high-definition image of the object of interest in a database.

In the context of the present invention, the words "comprise", "comprising" and the like are to be construed in their inclusive, as opposed to their exclusive, sense, that is in the sense of "including, but not limited to".

The invention is to be interpreted with reference to the at least one of the technical problems described or affiliated with the background art. The present aims to solve or ameliorate at least one of the technical problems and this may result in one or more advantageous effects as defined by this specification and described in detail with reference to the preferred embodiments of the present invention.

DESCRIPTION OF THE INVENTION

Figure 1:
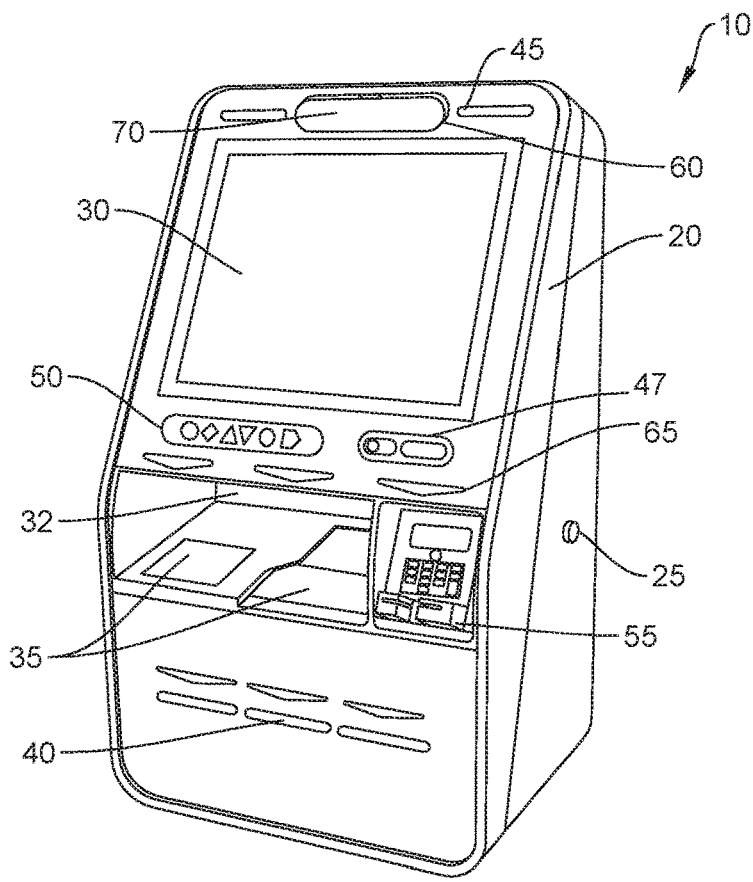
FIG. 1 illustrates an isometric view of an embodiment of a terminal with a biometric system.

Preferred embodiments of the invention will now be described with reference to the accompanying drawings and non-limiting examples.

In one embodiment, there is provided a self-service check-in device 10 which comprises a device body 20, a processor and a display 30. The display 30 is preferably a touch screen display or an interactive display arranged to be viewable by an average-height user, and may be angled to allow ease of interaction and viewing. Preferably, the display 30 is arranged or mounted on the upper portion of the device body 20. The processor is in communication with the display 30, either wirelessly or via a wire. A document reader 35 or scanner 35 is preferably located on the device and can be used to scan a card, ticket, passport, identification (ID) tag, RFID tag, or other personal identifiers of the user of the device. Further, a magnetic track 59 may also be used to insert identification or an associated card. The document reader 35 can be any reader known in the art adapted to detect any one of a predetermined; code, bar code, reference, identifier or embossing or mark on a document, passport, ticket, boarding pass, or card. In addition, the device 10 may be used to print a boarding pass or ticket for transit or reference. The document reader 35 may be located in a recess 32 or shelf to allow for placement of a document onto the document reader 35 without a user of the device holding their document. The device 10 may be wired or wirelessly connected to a network and/or other systems by conventional means.

The document reader 35 and a printer 40 in this embodiment are preferably connected or in communication with the processor of the device 10. After the scanner 35 reads a document inserted into the device 10, the processor controls the printer 40 to print a boarding pass. Alternatively, after the document reader 35 reads an inserted document or passport, the processor controls the printer 40 to print at least one of a boarding pass associated with the subject 1, a luggage tag, a heavy luggage tag, or another pass or marked ticket or token.

In another embodiment, the device 10 may be used to check-in and subsequently print a boarding pass for an aircraft, boat, bus or other predetermined transit vehicle; or a ticket for an event or similar. The printer 40 may also be adapted to print luggage tags, or other identifier tags or tickets which are associated with the subject 1.

The device 10 may also comprise a Near Field Communication (NFC) device 57 which may be adapted to transact payments from a credit card, debit card or payment method. Optionally, the NFC device 57 can be integrated into a contactless payment card reader 55, or similar device. The contactless card reader 55 may be any desired card reader known in the art, and may comprise keys or PIN-pad. A tactile interface or navigation panel 50 may be provided for interacting with the terminal if a subject 1 does not wish to touch the display panel 30 or the display is not receiving inputs via touch.

The device 10 may also include a number of LED lights or other visual means to attract attention of the user 1, who may be a passenger or subject. This may prompt a passenger to turn towards the terminal to use said terminal, or it may prompt a user to face a terminal and an image of the subject 1 can be captured for record. In this embodiment, persons within a location can be tracked by the device in addition to other security cameras and security means at said location.

Optionally, the device 10 may allow for the selection of ancillary services such as a preferred available seat, the addition of luggage or baggage, the inclusion of heavy luggage or any other predetermined options that a transit company may offer.

Optionally, wires may be used to connect components of the device 10 with other components, such as the display monitor 30 to cameras 72, 74, or hardware to the processor of the device. Programs and algorithms operate the cameras 72, 74 or hardware of the device 10.

Referring to FIG. 1, there is illustrated an embodiment of a device 10 for checking-in a subject. The device comprises a device body 20 or device housing which stored the hardware or allows for mounting of the hardware of the device, a display 30 with which the user can interact with an application, and a biometric system 70.

The device 10 further includes a speaker 45 and a lighting system 65 on the front plane 60 and a navigation interface 50 or tactile interface for a subject to interact with the device 10. A peripheral port 47 may optionally be provided for inputting headphones or other devices to interact with the device 10. Printers 40 are disposed on the lower portion of the device 10, and may be used to print bag tags, boarding passes, identification passes, or permits. A document reader 35 and scanner are provided in recess 32 which can be used to capture data from a document. A payment system or card reader 55 is also provided to allow for payments. A laser projector 25 or point cloud generation device may assist with mapping and detection of a subject.

Figure 2:
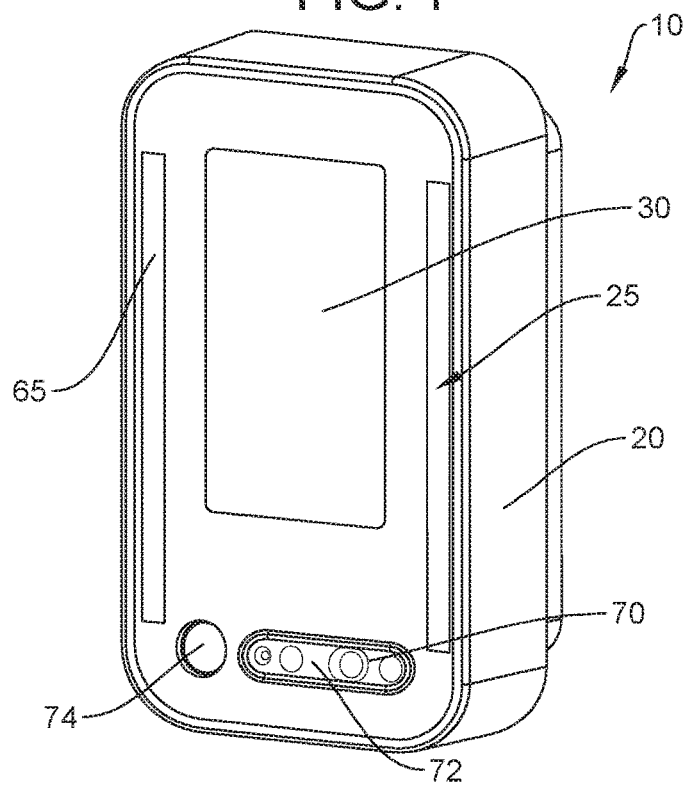
FIG. 2 illustrates an isometric view of an embodiment of a terminal with a biometric system.

FIG. 2 illustrates an embodiment of another device 10, in which there is shown a "pod" device. This device may be used for monitoring and determining biometrics of a subject at gates, lounges, doors, or restricted areas. The device includes a device housing 20, a display 30 and a biometric system 70. The biometric system comprises a first image capture device 72 and a second image capture device 74. A set of illumination means or lights 65 mounted on the front facie 60 of the device 10. A laser projector 25 or point cloud generation device to assist with mapping and detection of subjects. Optionally, the device 10 of FIG. 2 may be a portable device which can be used to determine the identities of persons. Please note that a point cloud generation device is a device that projects a cloud or plurality of light-based dot points (including but not limited to infrared LED projected dots) onto the face of the user or passenger for purposes of biometric analysis and facial topographic mapping by the system.

Figure 3:
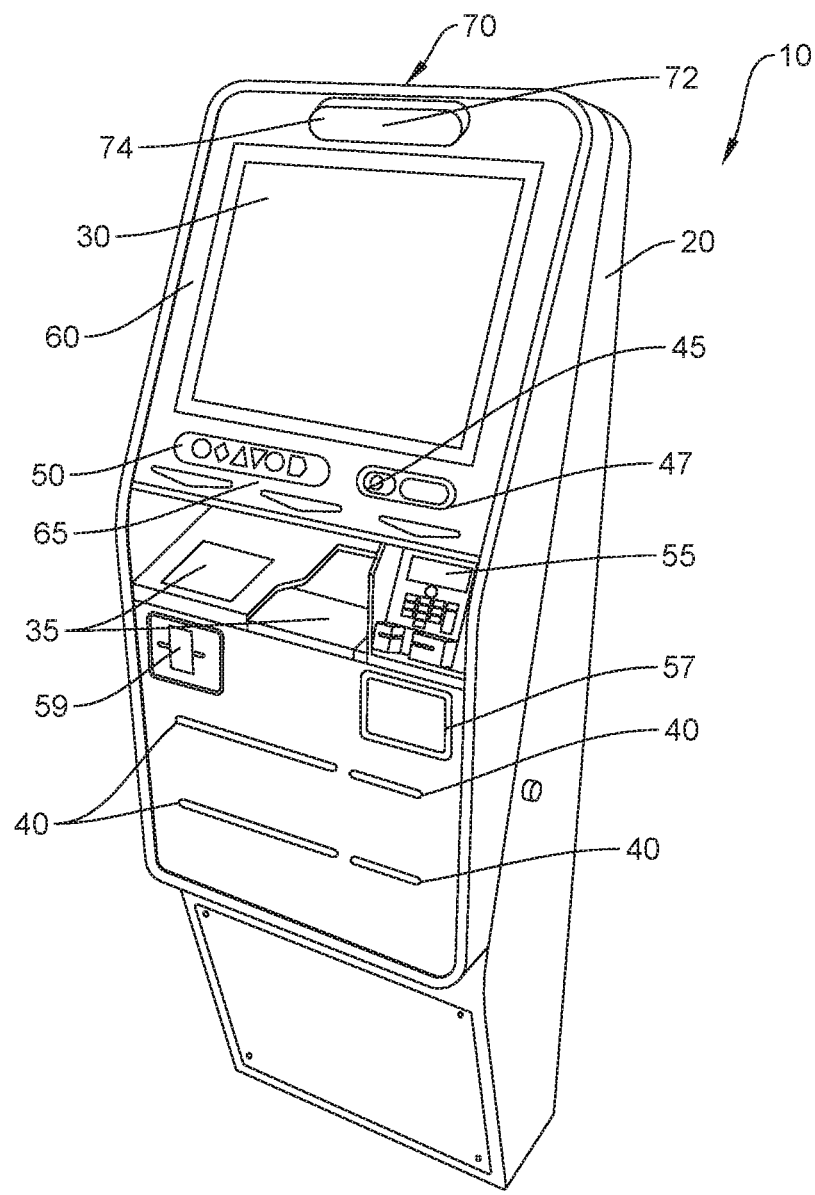
FIG. 3 illustrates an isometric view of an embodiment of a terminal with a biometric system.

Referring to FIG. 3, there is illustrated an embodiment of yet another device 10 which is similar to that of the device illustrated in FIG. 1. However, this device 10 may be a free-standing grounded terminal or kiosk which can be used to print boarding passes and tags for luggage. This device also includes NFC devices 57 and a magnetic card reader 59.

Figure 4:
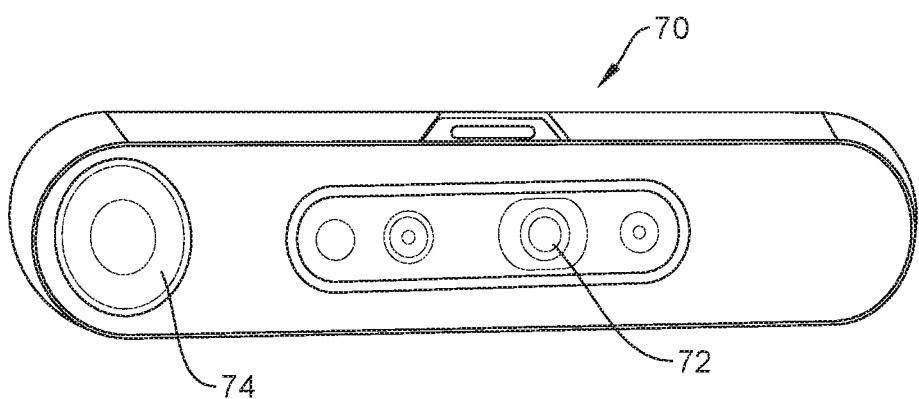
FIG. 4 illustrates an isometric view of an embodiment of a terminal with a biometric system.

FIG. 4 illustrates an embodiment of a biometric system 70, which can be installed in a device 10. The biometric system comprises a first image capture device 72, which may be in the form of a stereoscopic 3D camera, and a second image capture device 74, which may be a high-resolution image capture means. Optionally, a laser projector or IR sensor/emitter is provided in the biometric system 70 or within the device 10. The laser projector or IR sensor/emitter may optionally be disposed behind the display 30.

In yet another embodiment, the device 10 is adapted to determine subjects within a predetermined field of view and/or within a predetermined region. Outside of the predetermined region subjects 1 may be ignored or excluded from processing. This may allow for movement of subjects outside of the region without biometric matching processes being carried out on these subjects. This can improve the privacy of subjects 1 outside of the virtual region, while also allowing more targeted processing to be achieved.

It will be appreciated that these biometric systems 70 can also be installed at other predetermined locations to verify the identity of a passenger or subject 1 or to retain a record of persons at predetermined locations. For example, the biometric system of the present disclosure may be installed at self-checked luggage terminals or at check-in desks with attendants.

Figure 5:
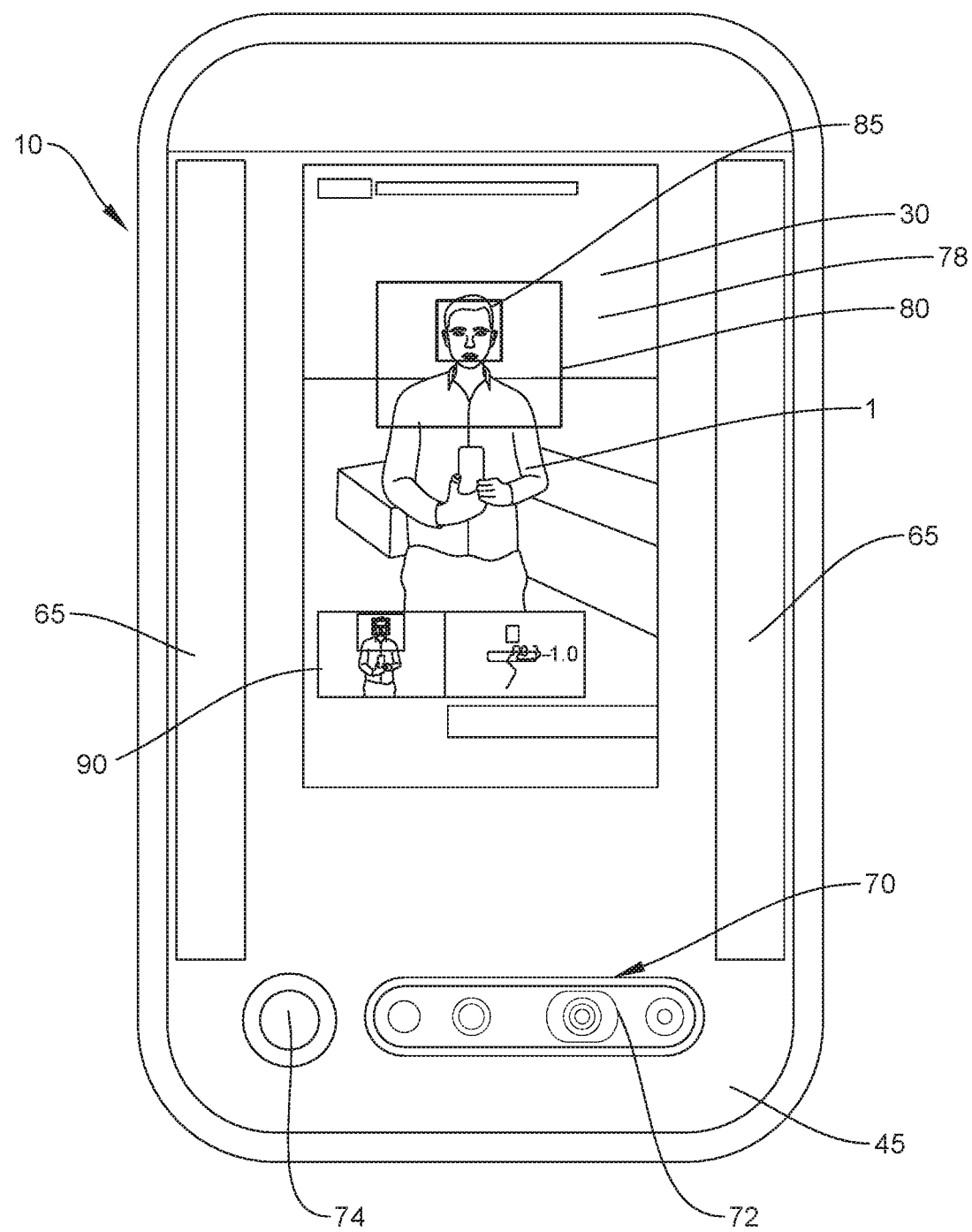
FIG. 5 illustrates an isometric view of an embodiment of a terminal with a biometric system.

The biometric system 70 comprises a collection of hardware components which can be configured to function as a single unit. The biometric system 70 may comprise distributed software, data management systems and image capture devices or light emitting devices and sensors. Preferably, the biometric system 70 comprises a first capture device 72 and a second capture device 74. More than two capture devices may be used with the device 10. The first capture device 72 may be a 3D image capture device, and the second capture device 74 may be a 2D image capture device. In use, the system may utilise the first capture device 72 to establish a spatial region or virtual region 78 which can be used to detect subjects 1 or possible subjects 1 within said region as shown in FIG. 5. The first capture device 72 may also be adapted to increase or decrease magnification of a region. Optionally, a fish eye lens or other spatial augmenting lens may be used to alter, increase, or decrease the field of view or the monitored spatial region.

The first 72 and/or second 74 image capture devices of the biometric system 70 may be a "depth camera" which can determine the relative distance of a subject 1 from the device 10. The distance may be determined using 3D segmentation by a processor or the like. 3D segmentation can also be used to distinguish or differentiate objects within a region and in particular can be used to isolate subjects 1 from static or undesired objects within the region. Preferably, the biometric system 70 can be used to isolate subject faces using known face-recognition software or likely locations in which a subject face may be located. This isolation may be achieved by generating a sub-region 80 around a subject 1, and then determining within the sub-region 80 a target region 85 in which the target subject for image capture may be. The sub-region 80 may be formed by a 3D segmentation process. The target region 85 may be formed using various known image-processing algorithms such as facial recognition algorithms or movement-registration algorithms that recognise small movements such as blinking or other face twitches. Other systems may be used to isolate the sub-region 80 and target region 85 depending on what the target region should contain for the system to work most optimally.

While a number of known devices utilise 3D segmentation, there are a number of issues associated with correctly identifying a target subject 1. This is particularly the case when there are a number of subjects 1 in a queue to use the device 10 or a large number of persons walking around in the background of the field of view of the device 10, and this can result in a large number of false hits and a significant number of undesired target regions 85 being identified.

As such, the device 10 can restrict or constrain the field of view of the device 10 to a predetermined virtual region 78 or virtual field of view. This allows subjects 1 outside of the constrained field of view the device 10 to be excluded from assessment and thereby reduce processing requirements of the device 10. It will be appreciated that the sub-region 80 and the target region 85 are both preferably configured to be part of or within the spatial region or virtual region 78.

Once the biometric system 70 of the device 10 detects a subject 1 within the virtual region 78, the first image capture device 72 will attempt to locate the face or head or upper portion of the subject 1 within said region. If the device 10 determines that a face or head or upper body portion is detected, the device will attempt to isolate for the face, head or upper body of the subject 1 to capture a high-resolution image of the isolated portion of the subject 1. It will be appreciated that the isolated portion of the subject 1 may be any predetermined feature or item within the region. For example, the device 10 may be used to identify luggage or items being held or carried by a person rather than image capture of a person. In this case, the subject 1 will not be a person, but will be the luggage and/or item being held by the person. For example, fire arms may be identified by the device or other items which may pose a security risk.

The high-resolution image may be recorded or captured by the second image capture device 74. The first capture device 72 and the second capture device 74 are capture devices selected from the following group; a stereoscopic camera, a 3-dimensional camera, a 2-dimensional camera, a fish eye camera, an RF camera, a spectral camera, a digital camera, a motion sensor or any other predetermined conventional image capture means. Images captured by the biometric system 70 can be stored locally on a local storage medium or transmitted to a cloud or other conventional off-site storage facility.

While it is also common for terminals and kiosks to capture or record faces of subjects, there are a number of issues with conventional image capture systems. Notably, this is due to the relative location of the subject 1 within the field of view being of an unknown height, an unknown distance away and unidentifiable as the target subject 1 within a group of persons. This results in a significantly slow detection of desired subjects if the terminal or kiosk is even able to differentiate the correct subject 1. Detection of faces using conventional systems is also a significant issue due to slow frame rates of high-resolution cameras.

The device 10 of the present disclosure ameliorates these issues by identifying regions that can be specifically targeted by a high-resolution image capture means to reduce the processing required, and also to accelerate an accurate detection and capture of a high-resolution image of a subject 1 within the region.

To accelerate the capture of a high-resolution image, the biometric system 70 uses a three-dimensional (3D) segmentation method to allow for persons within the region to be tracked as they enter and move within the region. The first image capture means 72 may be used to track subjects 1 within a region and constantly and iteratively update the most desired image of the subject 1, such that a face match or facial identification of a target subject 1 can be called and verified by the device 10. The iterative process may contain a number of different repeated steps. The simplest but longest and heaviest in terms of processing load is to capture an image of any face within the sub-region and compare it with a gallery of expected faces. Alternatively, the image of any face within the sub-region may be compared with characteristics of expected faces. Yet alternatively, the image may be processed to identify the face with the greatest likelihood of being that of the user in question by analysing the direction of gaze of the user or the direction of the front of the face, the velocity of movements, and so on. This allows for greater potential of a correct face match with existing records which can allow for faster check-in times or faster verification systems to identify subjects. This may be of particular advantage with respect to border security identification systems.

Further, the device 10 may be adapted to take a number of targeted high-resolution images of a target subject 1 and assess the quality of the images to determine the best image(s) to retain on record.

The biometric system 70 may be configured to detect faces by conventional face detection methods known in the art. However, the device 10 is further adapted to assess the quality of the images captured by the biometric system 70. The assessment of captured images may be with respect to an optimal image standard or reference image. For example, an optimal image may be similar to the requirements for an enrolment photograph, such as a passport photograph where a subject 1 looks directly front-on towards a camera and is not smiling and there is no blur or distortion of the image. This may allow for facial topography locations to be captured, or other desired biometrics. Face landmark extraction methods may be used to assist with identification of faces with a "correct" or desired pose for facial recognition processing.

The assessment may rank or provide a score to characteristics of an image, such as the image quality focus, the pose, position or alignment of the subject 1 relative to the biometric system 70, face resolution, and number of images captured. The face resolution captured may be with respect to the number of pixels which are associated with the image. If there are too few pixels, then the device is likely to provide a score or rating for the face resolution category lower relative to an image with a higher pixel count.

A benchmark or threshold score must be passed to successfully find a match of a subject 1 within a known reference database. When a predetermined number of characteristics are above a predetermined threshold, the device will store the image captured. Captured images may be associated with a subject profile or subject account with the device 10, and may be historically stored or replaced with images which score higher than previously captured images. Accumulation of high-quality face images may allow for an improved face matching or improved facial recognition of a subject 1.

Having a higher resolution image allows for details of the subject 1 to be exposed. Once an image meets the minimum thresholds for at least one of; blur (focus), resolution, and alignment, the image may have sufficient detail to begin a matching process to match the subject 1 with a subject 1 contained within a database which is accessible via the device 10.

Each parameter or criterion of the image captured may increase an overall multi-variant score. As such, if an overall multi-variant score of a respective subsequent image captured is higher than previously captured with lower scores, the subsequent images may be used in place of the previously captured image(s) or the lowest scoring image on record, as the subsequent image will represent a higher quality image overall and may allow for improved facial recognition or subject 1 matching. In this way, a best or optimal image can be recorded of a subject 1 at the time of using, or being within the virtual region 78 of, the device 10. The software of the device 10 is adapted to execute an iterative algorithm which captures images iteratively and compares new images of a subject 1 to historical images of the subject 1. As such, an image captured at time A can be compared to an image captured at time B, for example.

The device 10 is also adapted to resize a subject 1 within a target high-resolution image capture region which can reduce the potential of repeatedly capturing a high-resolution image which is relatively blurry. The device 10 is adapted to upload data from captured images into a function to determine whether a subsequently-captured image is a more desirable image to retain. It is preferred that during an interaction with the device, the device can capture and store a minimum number of images of a target subject 1 per time period. This is to say that 5 images may be captured and stored per second, but over a period of 1 minute, a total number of 10 (ten) or fewer images may be stored for the interaction period within the region. The 10 (ten) images stored may be analysed to determine the preferred or most optimal images which can be used for facial recognition or face-matching purposes.

Figure 6:
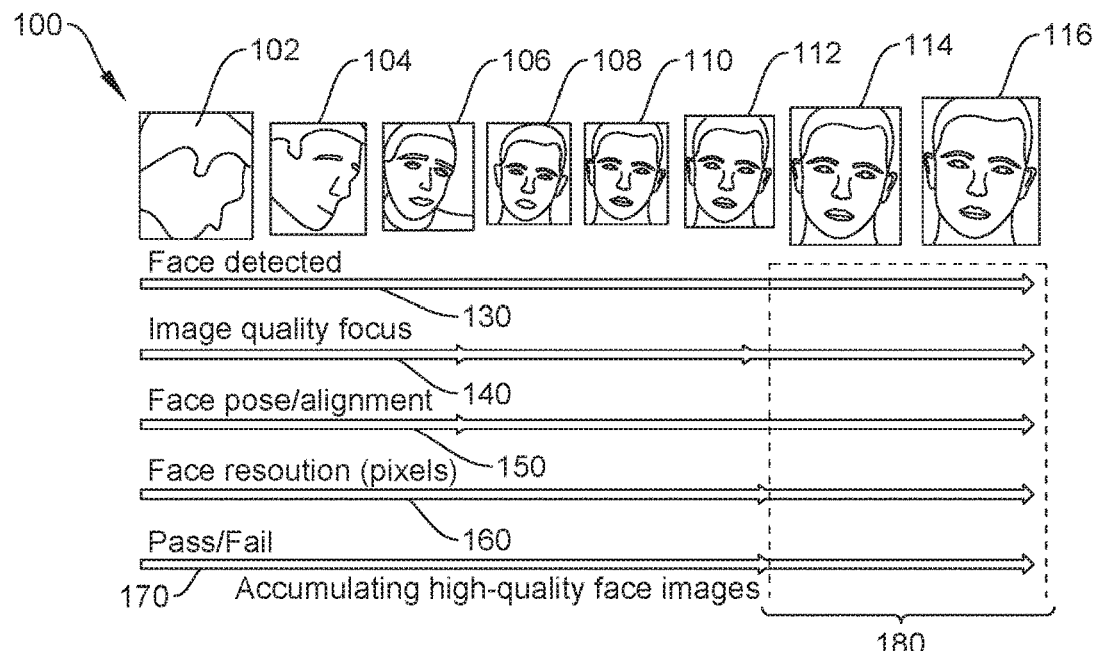
FIG. 6 illustrates an isometric view of an embodiment of a terminal with a biometric system.

Referring to FIG. 6, there is shown an embodiment of parameters for image acceptance 100 for subsequent facial recognition processes. A plurality of images 102-116 of a target region have been captured. Each of these captured images is associated with a score based on at least one parameter of a detected face 130 such as image quality/focus 140, face pose/alignment 150, face resolution/pixel count 160, and an overall pass or fail score 170. For example, in the embodiment illustrated, images 102-112 have not received a pass score and are not desirable for facial recognition processing as at least one threshold for focus, alignment and resolution have not been met. As can be seen, the images are unfocused and contain blur, are of an unaligned or clear shot of the face of the subject or are low resolution. Images 108-112 may have a more desired pose or alignment of a subject captured, however the images may have too few pixels, poor focus or have a low resolution, such that a pass score is not achieved. Images 114 and 116 have received a pass score as the parameters 180 are all above a desired threshold and the captured images can be used for facial recognition purposes. The scores are preferably derived using a learning algorithm or a weighted average score calculated by the controller.

If further captured images receive better respective scores, the images with a higher scores may be used to replace images with lesser scores associated therewith. In this way at least one image can be stored by the device and retained as a record for the subject 1. These images can be associated with a subject profile or subject account which may be accessed by one or more third parties, such as a government body, a company or a service provider.

The biometric system 70 may be adapted to generate a virtual region 78 in which images of subjects can be captured. Preferably, the first image capture device 72 can generate the virtual region 78. The subject 1 can also be identified in the virtual region 78 and a target region can be generated where a likely target subject 1 portion can be observed, such as a subject face. A second image capture device 74 can be activated and directed to capture an image of the target region identified by the first image capture means 72 which can result in a relatively small high-resolution image being captured which can be rendered and assessed faster than conventional means.

FIG. 5 illustrates the device of FIG. 2 in use, wherein a subject 1 can be seen on the display 30. A target region 85 can be observed around the subject face, and a sub-region 80 is illustrated around the torso and face of the subject 1. In the sub-region 80 a point cloud can be used to determine the depth of the subject and/or the peaks and/or contours of the subject within the sub-region 80. This can then be used to isolate the target region 85, such that the face of the subject 1 can be targeted by a high-resolution image capture device. The target may be tracked on the screen in window 90 which can show the subject at least one of the; virtual region 78, sub-region 80 and the target region 85. Tracking may display the distance the subject 1 is from the device 10, or may display the tracking path of the subject 1. Optionally, the display may be adapted to show a "match" image of the target if a successful facial recognition is performed. In one embodiment, if the subject 1 disagrees with the match made by the device 10 the subject may call an attendant or submit an error report to indicate that the "match" is incorrect and the device 10 may attempt to perform a subsequent facial recognition of the subject 1. This may be of particular importance in the case of identical twins or persons with a very similar appearance, or have changed their overall appearance. For example, a subject's face appearance may be different from that on record due to wearing glasses, growing facial hair, surgery, scarring, ageing or any other similar occurrence.

While in the virtual region 78, a target subject 1 can be tracked and distinguished from other subjects 1 within the region. Each subject 1 within a region may at one time be considered to be a target subject based on their use with the device 10, or if they are considered to be the target subject within the virtual region 78. This may allow for groups of subjects to be more easily assessed as a target subject can be tracked more effectively within the region. Each subject 1 in the region may be assigned a discrete sub-region 80. The sub-region may be an orientation box 80 in some embodiments.

The biometric system 70 may utilise two parallel processes, the first process being the activation of the first image capture device 72, which may be a 3D camera or a depth imaging camera, and a second process being the activation of the second image capture device 74 when a target subject 1 has been determined to be within the virtual region 78, such that a high-resolution image can be captured.

In this way, a 3D image can be captured to create a one or more sub-region 80 with respective target regions 85 using the first process, and a 2D image can be captured by the second image capture device 74 for each of the target regions 85 to conduct facial recognition or item identification using the second process. As the target regions 85 are the only regions which data is considered for analysis, these regions can be mapped and assessed relatively faster than known methods. These processes can be used to accelerate the image capture and assessment of subjects 1 up to between 2 and 20 times faster than conventional methods. Typically, the assessment is between 2 to 8 times faster than conventional methods, when using the same processor as is used with known terminals or kiosks. As such, the determination of the subject location before capture of a high-resolution image allows for improved processing.

Further, using parallel processes allows for a higher frame rate as processing power does not need to be as high as conventional devices. For example, conventional devices are generally limited to 1 to 2 frames per second, whereas the present device 10 may achieve frame rates of between 1 to 10 frames per second. It will be appreciated that with more robust or increased processing power from hardware the frame rate capture will also increase.

Further, constraint of the virtual region 78 will allow for subjects to be recorded or captured with reduced clutter or background noise which can also make visual identification more efficient. Further, reducing the spatial movement of the subject 1 may assist with maintaining the identity of the subject 1. As such, localising a target region for image capture can assist with high-fidelity facial recognition.

The device 10 is preferably adapted to perform 3D segmentation on a sub-region 80 within the virtual region 78. This allows for identified subjects within the region to be processed, and subsequently a face or other target region can be identified for capture of a high-resolution image.

Once a target subject 1 has been identified in the region, the subject 1 can be tracked in a sub-region 80 within the region and further subjects may optionally be processed and identified within the region. If a subject 1 exits the region and returns in a predetermined time, the device 10 may be adapted to reassess the subject and determine whether the subject 1 has previously been identified by the device 10, which may further reduce identification times.

A list of 3D regions of the subject 1 is the output of the process, which may be transformed to high resolution cameras to establish a region of interest. At least one image is extracted from the first image capture device 72 and the second image capture device 74 can be used to capture an image, which is preferably a 2D image, of a target region of the 3D image taken such that a high-resolution image can be captured of the target region 85.

A 3D virtual region 78 can be generated by the biometric system 70 such that a predetermined virtual region 78 can be masked. Preferably, the device 10 masks the XY vector such that regions can be excluded from assessment or image capture. A 2D image can be captured with a higher certainty using this masking method. This may also allow for close spacing of cameras or other image capture means to be packed close together, which is advantageous for smaller devices 10.

After a 3D virtual region 78 has been generated, a 3D point cloud (herein referred to as "point cloud") is generated for the 3D virtual region 78. Inbuilt calibration processes of the first image capture device 72 can be used to generate said point cloud. Lasers and/or laser projectors 25 can be used to generate the point cloud for the 3D virtual region 78. The lasers may be mounted behind the display 30 or be associated with the biometric system 70, or mounted on any predetermined portion of the device 10. Data can subsequently be projected in a vertical orientation, or any other predetermined orientation depending on the likely orientation of a target subject 1 to find a sub-region 80. A calibration step may be required to calibrate the first image capture device 72 for a 3D segmentation process. The 3D segmentation process may be similar to that used for isolating subjects in images captured in tomography systems and MRI systems. This allows for at least a portion of a three-dimensional subject 1 to be virtually constructed which reflects the subject 1 within the virtual region 78.

However, unlike conventional tomography systems and MRI image building systems, the biometric system 70 of the present device 10 utilises an algorithm for 3D segmentation processing which constrains the region in which 3D segmentation processing is conducted. This constraint is limiting the 3D segmentation region in a vertical orientation, which is typically the orientation in which a subject 1 will be orientated as they will typically be standing in front of the device 10. As such, the 3D segmentation process is configured to begin near to the top of the region and therefore may detect a target region relatively more quickly and with less processing. As such, the 3D segmentation process may utilise a region growing method which can be used to construct a virtual image and build (or fill) outward beginning from an optimal seed location.

The device 10 may be configured to utilise a region grain and fill from the top of the region towards the bottom of the sub-region 80. The device 10 will exploit the constraints of the sub-region to make processing faster. Once a 3D segmented region is output, the device 10 can detect vertical objects inside that view.

Once vertical object detection processes are executed to generate a sub-region, a target region 85 can be defined in said sub-region 85. As the device 10 is adapted to perform facial recognition, the device 10 may be configured to ignore or exclude a subject 1 body, or portion thereof, from processing. Exclusion of at least a portion of the subject body from assessment and processing can expedite the facial recognition processing and matching. As the 3D segmentation can identify the facial region of a subject 1, which may be the target region, the size and shape of the segmented vertical object can be used to calculate the exact location of the target region of the subject 1. In one embodiment, the target region is the face of a subject 1. Further, the device 10 may be adapted such that 3D segmentation can be performed by generating a 3D segmentation of a target region and when the device has identified a portion of a subject 1 face, a vertical half of the target region can be mapped and the other half of the region can be estimated as a subject 1 will generally have a substantially symmetrical face. In another embodiment, the width and height of a target subject 1 can be estimated based on a portion of a generated 3D segmentation output and the target face can be found using this method. Optionally, both width and height assumptions and symmetrical assumptions of biometric data can be used to more readily generate a target region, or a region of interest for 2D image capture.

If another object is to be mapped which is not a face, it will be appreciated that portions of the subject 1 can be estimated or assumed as part of the output to accelerate identification of a target region, similar to the face identification process.

Once a target region has been identified, the target region 85 may undergo further segmentation such that the target region size can be decreased to more quickly perform facial recognition processing. This is to say, a target region 85 may be generated which is larger to allow for a region of uncertainty and further 3D segmentation steps may be conducted to decrease the size of the target region.

If there is more than one subject 1 within the virtual region 78, the device 10 may record a list of 3D images, or target regions to be assessed. The device 10 can use these images to track subjects within the virtual region 78 and assign an importance or hierarchy to the detected subjects within the virtual region 78. Each of the detected subjects 1 within the virtual region 78 can be assigned a hierarchy based on any number of parameters, such as proximity to the device 10, depth in a queue, length of time within a virtual region 78, or any other predetermined parameter.

In another embodiment, the device 10 is configured to capture and record images of any subject within the hierarchy if the images captured are above a desired multi-variant score. This may assist with reducing the time required to find a match if this subject uses the device 10.

Once a target region has been generated, the system may activate or direct the second capture device 74 to view the target region. This may be done by guiding the viewing angle of the second image capture device 74 toward the target region based on the determined XY coordinates and/or XYZ coordinates of the subject 1. The virtual region 78 will be associated with a XYZ coordinate system as the virtual region will be a 3D virtual region 78.

The target region 85 can be targeted via calibration from the first image capture device 72 and the second image capture device 74. It will be appreciated that each of the first and second image capture devices 72, 74 will have respective coordinate systems which are known to allow for correct targeting of the target region. Optionally, the first image capture device 74 will have a different resolution and/or optics than that of the second image capture device 74, however a spatial region can still be generated using these image capture devices by calibration of each image capture device respectively.

It will be appreciated that the first and second image capture devices 72, 74 can be factory-calibrated or manually calibrated by a technician. The devices can also be configured to carry out an automatic or software-based electronic calibration in further embodiments. Preferably, the first and second image capture means are a known distance from each other in the device 10 such that determination of targeting angles and target regions can be determined without error, or within a tolerance of error.

Preferably, the first image capture device 72 and the second image capture device 74 are relatively close to each other. For example, the spacing between the image capture devices may be in the range of 1 mm to 1000 mm. More preferably, the capture devices 72, 74 are between 3 mm to 50 mm apart. More than one high-resolution image capture device may be used with the biometric system 70, such that if the lens of the second capture means is dirty, obscured or otherwise damaged, a high-resolution image can be captured for facial recognition processing.

The first image capture device and the second image capture device may establish a geometric relationship such that target regions can be aligned correctly with a desired degree of accuracy. It will be appreciated that target regions desirably have less than 5 mm of inaccuracy with respect to the actual subject of the image.

A depth camera (first image capture device 72) may be used to locate the upper torso of a subject 1 and that region is transmitted to the high-resolution camera, such that face detection can occur. Face detection can be used to generate a target region 85. Once a face is detected, the 3D image capture device to capture additional biometric signatures from the target subject 1. Further, the 3D image capture device may then determine whether a detected face comprises natural peaks and contours, such that a 2D face, for example a photograph of a face, cannot be detected as a subject 1 face, as the face will not considered to be a "live" face. Thermal or IR sensors may also be used to verify whether the subject face is a "live" face.

Historically, terminals will compare a captured image of the subject 1 to a document identification provided by the subject 1 for biometric assessment. While the present device 10 may also be configured to perform this basic check, the device 10 will also generate a "token" which is a unique identifier assigned to the subject 1. In the case of a flight; a token may be generated at the time of check-in or booking of the flight in the airport, and the token may be centrally updated such that other monitoring systems can be used to track the token or allow access to locations based on the token permissions.

For example, a token may be associated with permissions to use the printer of a terminal or kiosk within an airport and may allow for modification/selection of seats or may allow for modification to baggage allowances. The token may also be updated when check-in is completed, or subsequent tasks have been completed. For example, after a user checks-in, a subsequent task may be to deposit bags into a bag-drop or similar device. After the bags have been successfully deposited, the token may be updated again to retain a record of actions the subject 1 has undertaken. Tokens may also be used to access boarding gates or lounges within the airport. Verification of a subject 1 may be achieved by biometric systems 70 at the boarding gate or lounge entrance, or subjects may be tracked by existing airport security systems and the token associated with the passenger may open gates or doors when they are in close proximity.

Optionally, device 10 may be in communication with at least one further device 10 such that subjects can be tracked with biometric verification (via biometric systems 70) captured by each device 10 in communication. Preferably, each device 10 comprises the same or generally the same hardware such that calibration between devices can be achieved within similar time periods and/or be more accurate. This may further assist with determining whether subjects are performing tasks or other persons are performing tasks on their behalf. This is a particular concern in relation to luggage check-in as unknown items may be within checked-in luggage associated with a subject 1.

The device is in communication with a network which may store data in relation to a subject 1 and their flight or travel data. Further, the device 10 may have access to historical biometric data of subjects to allow for facial recognition to be performed. Typical facial recognition processes may be used to compare and determine whether a subject 1 is successfully matched with stored data.

For example, the device of FIG. 2 may be used for gate access, hotel check-in, lounge access, or any other predetermined function which requires little input from a subject. These devices 10 may be fitted with a fluid-tight shell such that they can be disposed in outside environments or in uncontrolled environments.

Proprietary neural network face recognition processes and models may be used with the device, or third-party face-recognition processes and models may be used if desired. These face-recognition processes and models may allow for searching of accessible databases for subjects with key facial markers to more quickly detect a match between a subject 1 and stored data within the accessible databases.

Optionally, the device may allow for facial recognition processes to be conducted by another portion of the network rather than the device 10. This may allow for smaller devices 10 to capture biometrics and processing can be conducted by larger devices off-site and verification, authentication or refusal can be issued to the device 10 when a match is found or is not found within a predetermined period of time or if there are no matches yielded by the recognition process.

To assist with facial recognition, the brightness and/or contrast of the image may be augmented by the device 10. This may be achieved by the lights 65 on the system emitting a predetermined wavelength towards a subject 1 to allow for facial features to be more clearly captured by the high-resolution camera.

In another embodiment, facial recognition is performed by using a peak detector to detect peaks of human anatomy. For example, an IR sensor or IR camera can be used to detect heat signatures of a subject 1. Heat signatures can be used to generate a heat map to determine the upper limit or top of a subject 1 which can then be used to restrict the target region size. This is of particular advantage as a target region can be restricted in at least one dimension based on the detected heat signature of a subject 1. Image data may be used to allow for morphology processing of features of a subject 1.

Morphology processing can also be used to differentiate between two or more subjects within a region and allow for tracking of a target subject 1 more easily.

The device can be adapted to determine a centre point of a 3D isolated target region in which the centre of a target subject 1 is probable to be located. As such, the 3D segmentation can be used to detect a target subject 1 and the second image capture device 74 can be used to capture a high-resolution image of the target subject 1.

The device 10 is also configured to use mapping models to rack and target a desired or target subject 1. This may use the projection of a plane from a first viewpoint to a second viewpoint. However, it will be appreciated that a target subject 1, such as a person's face, will not be a plane. As such, the device is adapted to capture and assess an infrared image with a colour image or RBG image to generate a matrix which can be used to project or map datapoints or topography of a subject 1 to determine biometric features of a subject 1 more quickly.

The device 10 may be adapted to assess captured images of the subjects 1. The viewing angle of the first image capture device 72 may be in the range of 180° degrees to 5°. More preferably, the viewing angle is restricted to between 100° and 30°. More preferably, the viewing angle is restricted to between 90° and 50°. In one example, the viewing angle is between 80° and 55°. In one specific embodiment, the viewing angle is between 58° to 7°.

Optionally, the first image capture device 72 may have a wider optical range to form the virtual region 78. In one embodiment, the first image capture device 72 has a viewing angle of 85° and the second image capture device may have a viewing angle of around 63°. These viewing angles are exemplary only, and are not limiting. The device may also be angled by a subject 1 for easier viewing if the display 30 is not positioned at a comfortable angle. The device may also be configured to be used by persons in a wheelchair or who are taller or shorter than the median settings, by allowing the vertical movement of the device 10 relative to the system it is attached with. For example, the device 10 may be mounted on a bag-drop unit or a security gate.

For example, using a first image capture device a dimension can be constrained within a predetermined distance from the camera. The predetermined constraint distance may be in the range of 0 mm to 2000 mm. This constrained field allows for the detection of the most proximal faces or likely objects to be faces to the 3D capture device and can allow for avoiding detection of faces which are outside of the region. However, the smaller constrained region not only avoids detection of faces which are not within the region, but can also allow for capture of a high resolution image of the face of the subject 1 within the region with a second image capture device.

While it is noted that current image capture systems generally take a high resolution image of subjects within a predetermined field of view, the processing requirements are substantial to render and detect the faces of the subjects captured within the field of view. Further, with existing devices there is no isolation of a subject 1 within a virtual region 78. Further, the existing devices do not isolate a sub-region 80 and/or a target region 85 within the virtual region 78.

The biometrics of a subject 1 that may be captured may include; height of a subject 1, subject position, ethnicity, gender, age, facial topography, temperature of a subject, and any other predetermined biometrics. Optionally, if the subject 1 is determined to have an unusual temperature, the subject 1 may be flagged for assessment by medial staff or terminal attendants as border control screenings may be necessary to limit movement of viruses or diseases.

Figure 7:
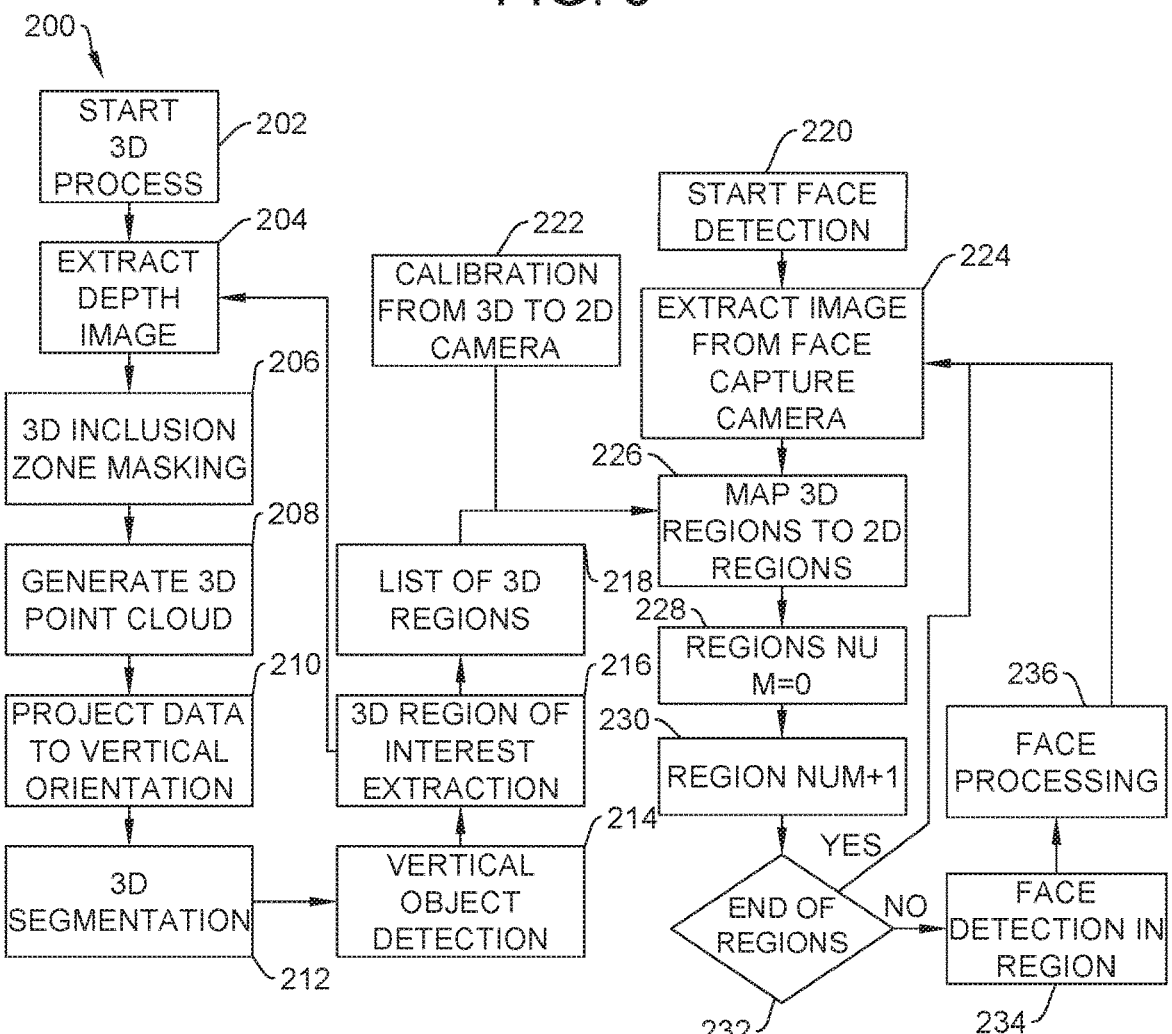
FIG. 7 illustrates a flowchart of a process for using a check-in terminal with a biometric system.

Referring to FIG. 7, there is illustrated an embodiment of a flowchart 200 for detecting a subject 1 within a region using a biometric system 70. The process begins by starting the first image capture device 202, which can be configured to generate a 3D image or series of 3D images which can be used to determine and extract 204 the depth of an image. Preferably, at least one constraint is applied to the 3D images (such as a mask) such that an inclusion zone or virtual region is identified in step 206. The system may then generate 208 a 3D point cloud which can detect objects and subjects within the virtual region. Data of detected subjects within the region can then be projected 210 in a vertical orientation, which will generally be the orientation of a person or subject. It will be appreciated that if the orientation of a subject is to be horizontal or another orientation, then the orientation may be configured in any predetermined manner. Within the vertical orientation a 3D segmentation process can be conducted 212. The 3D segmentation process can be used to detect or determine whether a subject or target portion of a subject is in the vertical orientation of the region 214. If a target portion of a subject is in view, the target portion of the subject will be identified as a region of interest or a target region 216. If more than one target region is detected a list of target regions will be generated 218 such that tracking of each target region may be conducted.

When target regions have been detected, a second image capture device can be used to start face detection processes 220 of the target regions. It will be appreciated that if the target region is to detect an object or another anatomy portion, then the second image capture device will be used to detect the object or desired anatomy portion. As face detection commences, the system will calibrate 222 from the first image capture device to the second image capture device for capturing images of the target region. The images captured by the second image capture device can be extracted 224 to be assessed. Mapping 226 of 3D regions to 2D regions can be conducted after capture of target region images. It is preferred that the target region images captured are high-resolution images. The biometric system will determine the number of target regions and capture a number of images of each respective region for assessment and scoring 228, 230. Assessment may be made with respect to historical images of subjects stored in a database. When all regions are mapped 232 and no target subjects are detected, then further images will be captured and extracted at 224. If further regions are detected which include target subjects, a face detection or object detection process will begin 234. Face processing 236 can then be conducted to rate and score the target subject to allow matching of the detected target subject within a database accessible by the system.

Figure 8:
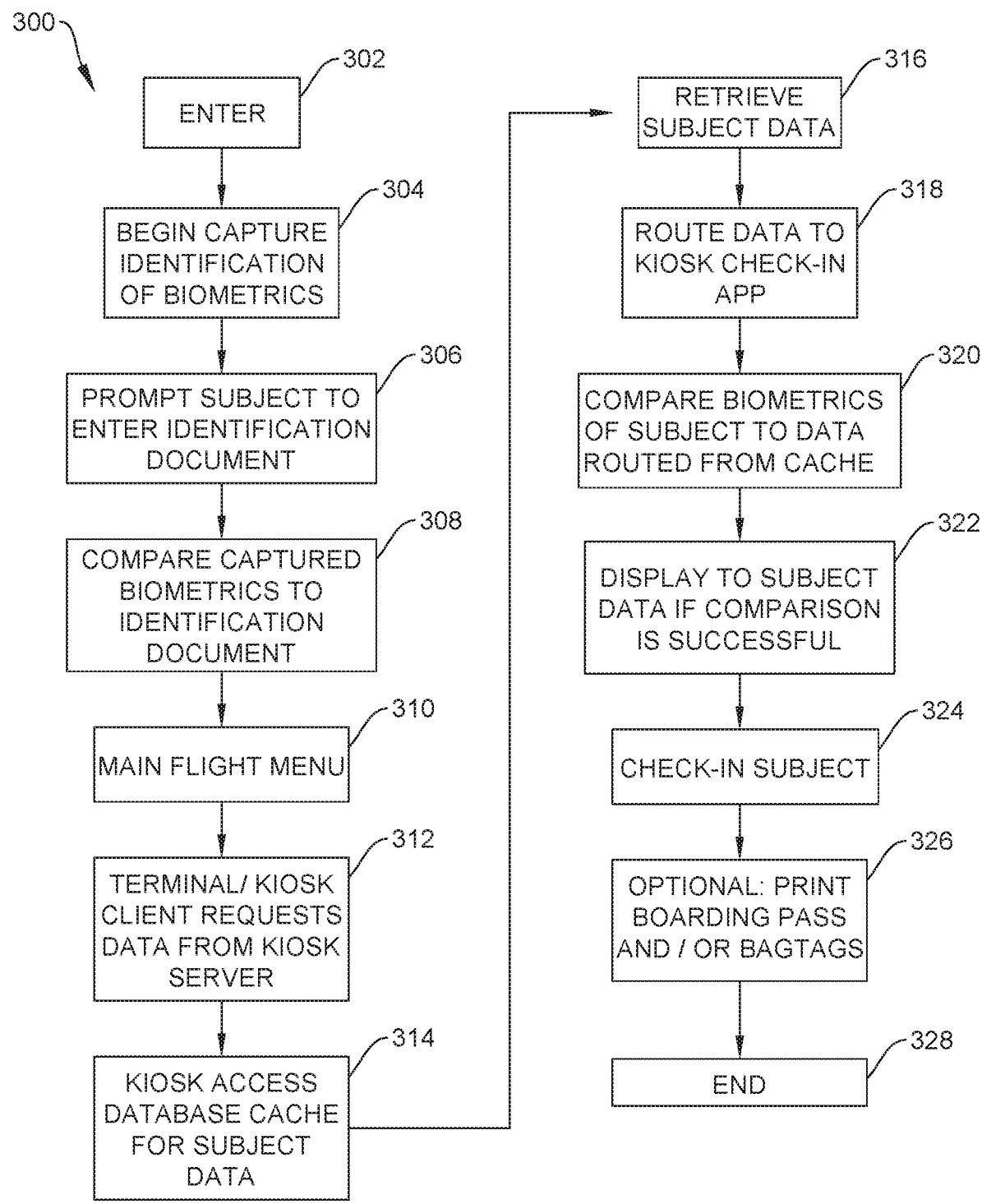
FIG. 8 illustrates another flowchart of a process for using a check-in terminal with a biometric system.

Turning to FIG. 8, there is illustrated a flowchart of a process 300 for using a terminal 10 with a biometric system 70. A subject begins by entering into a virtual region 302 generated by the biometric system 70. Capture 304 of 3D images of the subject commences as the subject enters into the virtual region and isolation processes begin. When the subject is at the terminal 10, the subject is prompted 306 to enter a passport or other verification document. The biometrics captured of the subject 1 by the biometric system 70 will then be compared 308 to a face or other identification marker of the passport or other verification document. Optionally, the system may be adapted to refuse further inputs by the subject if the system does not find a match between the captured biometrics and the face or other identification marker, and may direct the subject to seek assistance from a person at a desk or other terminal attendant for manual verification of the subject 1.

The subject 1 may then select flight data or other transit data via the main menu 310. In the flowchart shown in FIG. 8, this is a flight menu, however any terminal menu may be used which may be related or unrelated to transit. The terminal 10 client requests 312 data from the terminal server. The terminal database cache for subject data is accessed 314, and the relevant data is retrieved 316. The data can then be routed 318 to the terminal display via a check-in application or other software application. If the routed data includes stored biometrics of the subject, the stored biometrics may be compared 320 to the subject biometrics captured by the terminal at the time of use of the terminal. If there is a match, the data may be displayed 322 via the terminal to the user and the subject may check-in 324. If there is no match, the subject may be directed to an assistance desk or the terminal may request an attendant for assisting the subject. The subject may then optionally print 326 relevant boarding passes, bag tags, heavy bag tags, or other printable materials for their trip. When the subject leaves the terminal, the process resets 328 and a new subject may use the terminal to check-in 328.

The virtual region may have any desired shape or dimensions. The virtual region may be adapted to dynamically adjust at least one dimension such that the virtual region can be expanded and contracted to accommodate varying sizes of subjects, or to view subjects who are further away. Adjustment of the virtual region will also impact the processing requirements of the device, with smaller volume virtual regions allowing for reduced processing power of the device 10.

Desired shapes may include at least one of a; polyhedral, cube, prism, rectangular prism, triangular prism, cone, tetrahedron, octahedron, dodecahedron, icosahedron, hypercube, or any other desired shape which is desired to be the virtual region to allow for detection of subjects. Optionally, the device 10 is adapted to generate two or more discrete virtual regions, which may be used to omit a portion of space from detecting subjects.

Exclusion of subject 1 detection or omitted portions of space may be associated with a caller device which an attendant may wear or have on their person, such that the device does not need to process predetermined persons within the virtual region, which may be of particular use when a predetermined person is assisting users at a terminal. It will be appreciated that these persons may not use a terminal to personally check-in while they are omitted from biometric detection.

Although the invention has been described with reference to specific examples, it will be appreciated by those skilled in the art that the invention may be embodied in many other forms, in keeping with the broad principles and the spirit of the invention described herein.

The present invention and the described preferred embodiments specifically include at least one feature that is industrial applicable.

The invention claimed is:

1. A device for verifying a subject, the device comprising:
a device body;
a biometric system including:
   (i) a first image capture device having a first field of view, and
   (ii) a second image capture device having a second field of view containing at least a portion of the first field of view; and
a processor configured to:
   maintain a predetermined mask defining a restricted portion of the first field of view;
   capture, via the first image capture device, a point cloud depicting the restricted portion of the first field of view defined by the predetermined mask, the point cloud excluding a remainder of the first field of view outside the restricted portion;
   determine a target region of the point cloud containing a subject;
   continuously and iteratively track the subject in the restricted portion of the first field of view;
   based on calibration data associating coordinate systems of the first and second image capture devices, map the target region from the first field of view to a corresponding region of the second field of view;
   in response to the mapping, capture, via the second image capture device, an image of the corresponding region of the second field of view containing the subject; and
   conduct a facial identification process on the captured image of the subject.

2. The device as claimed in claim 1, wherein the first image capture device and the second image capture device are selected from the following group: a stereoscopic camera, a 3-dimensional camera, a 2-dimensional camera, a fish eye camera, an RGB camera, an RF camera, a spectral camera, a digital camera, a motion sensor and a combination of thereof.

3. The device as claimed in claim 1, wherein the processor is configured to detect the subject within the target region of the point cloud by segmenting the point cloud with a 3D segmentation process.

4. The device as claimed in claim 1, wherein the processor is further configured to associate the image with a score based on at least one parameter selected from the following group: target anatomy detected, image quality, focus, target anatomy pose, alignment, image resolution, and pixel count.

5. The device as claimed in claim 4, wherein the processor is further configured to capture, via the second image capture device, more than one image of the subject per time period, and to select one or more of the images for storage based on the scores associated with the images.

6. The device as claimed in claim 1, wherein the processor is further configured to store the captured image with an associated subject profile.

7. A method in a device for verifying a subject, the method comprising:

maintaining a predetermined mask defining a restricted portion of a first field of view of a first image capture device;
controlling the first image capture device to capture a point cloud depicting the restricted portion of the first field of view defined by the predetermined mask, the point cloud excluding a remainder of the first field of view outside the restricted portion;
determining a target region of the point cloud containing a subject;
continuously and iteratively tracking the subject in the restricted portion of the first field of view;
based on calibration data associating coordinate systems of the first and second image capture devices, mapping the target region from the first field of view to a corresponding region of a second field of view of a second image capture device, the second field of view containing at least a portion of the first field of view;
in response to the mapping, controlling the second image capture device to capture an image of the corresponding region of the second field of view containing the subject; and
conducting a facial identification process on the captured image of the subject.

8. The method as claimed in claim 7, further comprising: assessing the image with a score based on at least one parameter selected from the group: pixel count, focus, blur, resolution, alignment and stance of the subject.

9. The method of claim 7, wherein detecting the subject within the target region of the point cloud includes segmenting the point cloud with a 3D segmentation process.

10. The method of claim 8, further comprising controlling the second image capture device to capture more than one image of the subject per time period, and selecting one or more of the images for storage based on the scores associated with the images.

11. The method of claim 7, further comprising storing the captured image with an associated subject profile.

12. A non-transitory computer-readable medium containing computer-readable code which, when run on a processor, causes the processor to:
maintain a predetermined mask defining a restricted portion of a first field of view of a first image capture device;
capture, via the first image-capture device, a point cloud depicting the restricted portion of the first field of view defined by the predetermined mask, the point cloud excluding a remainder of the first field of view outside the restricted portion;
determine a target region of the point cloud containing a subject;
continuously and iteratively track the subject in the restricted portion of the first field of view;
based on calibration data associating coordinate systems of the first and second image capture devices, map the target region from the first field of view to a corresponding region of a second field of view of a second image capture device, the second field of view containing at least a portion of the first field of view;
in response to the mapping, capture, via a second image-capture device, an image of the corresponding region of the second field of view containing the subject; and
conduct a facial identification process on the captured image of the object of interest.

13. The non-transitory computer-readable medium as claimed in claim 12, wherein execution of the code further configures the processor to detect the subject within the target region of the point cloud by segmenting the point cloud with a 3D segmentation process.

14. The non-transitory computer-readable medium as claimed in claim 12, wherein execution of the code further configures the processor to associate the image with a score based on at least one parameter selected from the following group: target anatomy detected, image quality, focus, target anatomy pose, alignment, image resolution, and pixel count.

15. The non-transitory computer-readable medium as claimed in claim 14, wherein execution of the code further configures the processor to capture, via the second image capture device, more than one image of the subject per time period, and to select one or more of the images for storage based on the scores associated with the images.

16. The non-transitory computer-readable medium as claimed in claim 12, wherein execution of the code further configures the processor to store the captured image with an associated subject profile.

\* \* \* \* \*